Figure 1:
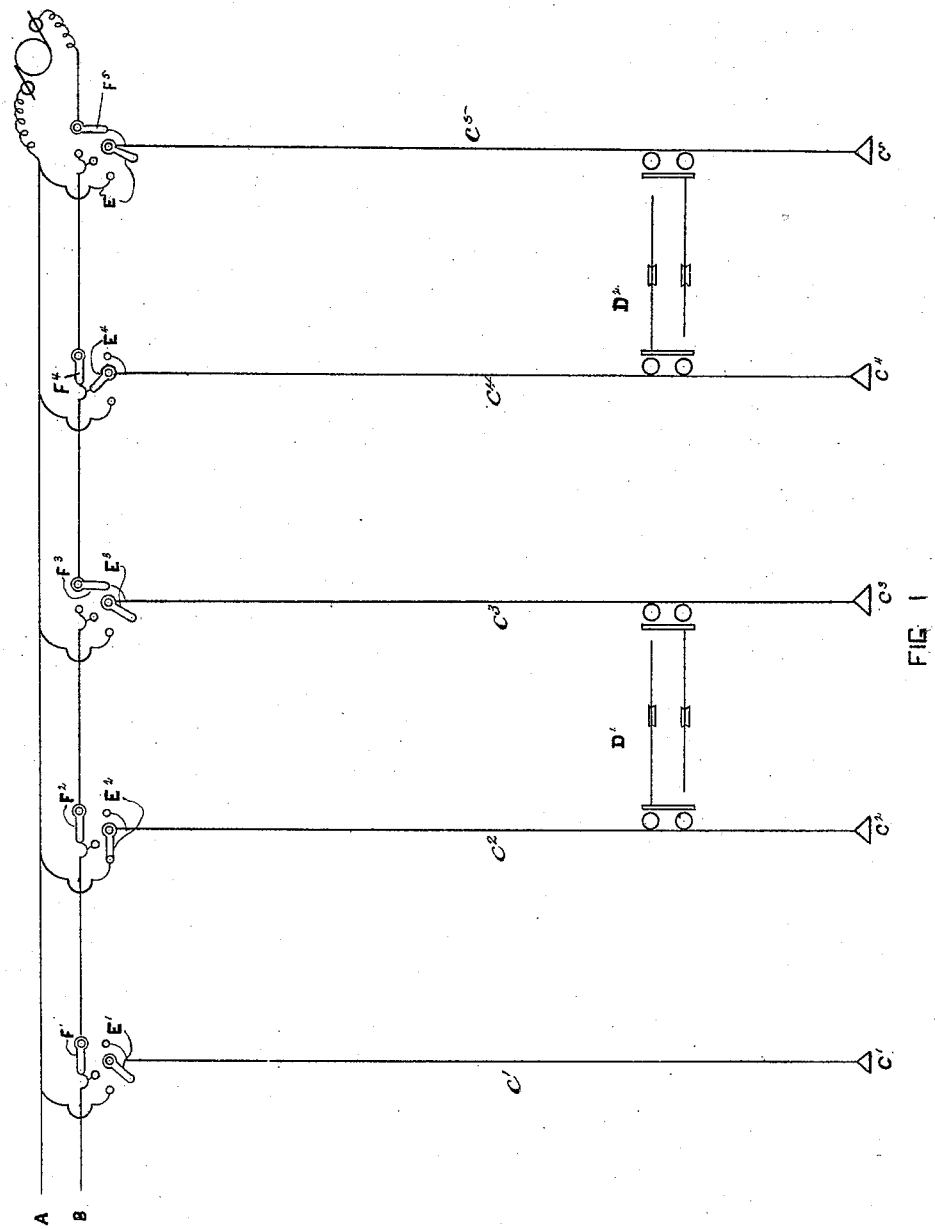

(No Model.) 3 Sheets—Sheet 1.

E. M. BENTLEY.
ELECTRIC AGRICULTURAL SYSTEM.

No. 444,265. Patented Jan. 6, 1891.

WITNESSES
Edward S. McKinney
S. McCauldwell

INVENTOR
Edward M. Bentley
by Bentley & Knight
attys (No Model.) 3 Sheets—Sheet 2.
E. M. BENTLEY.
ELECTRIC AGRICULTURAL SYSTEM.
No. 444,265. Patented Jan. 6, 1891.
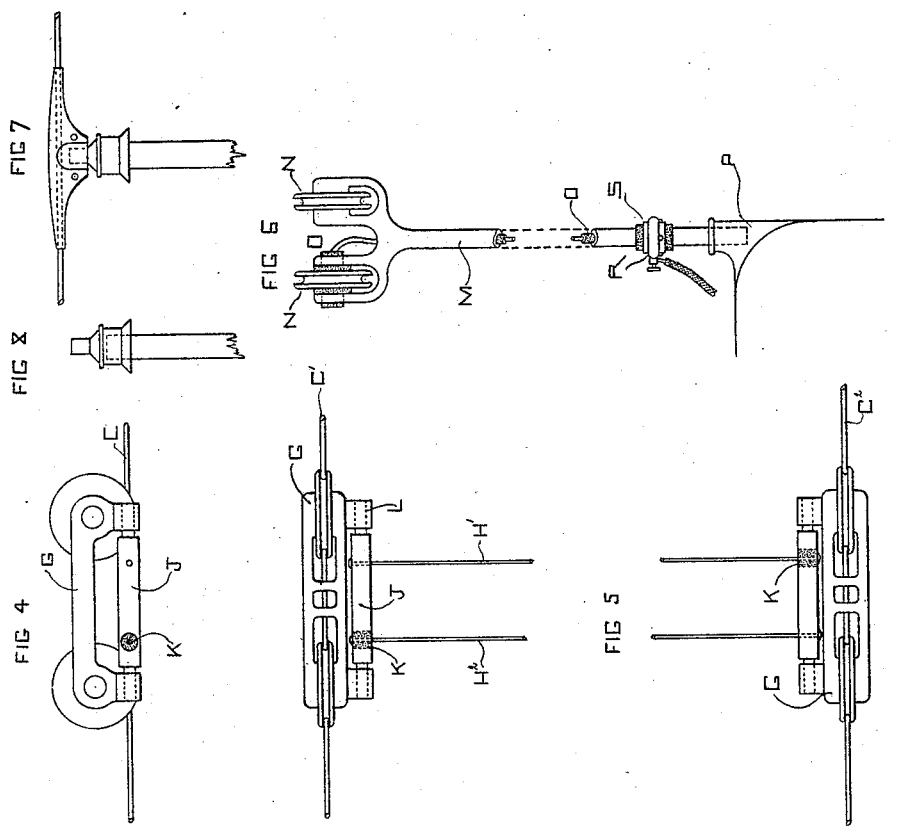
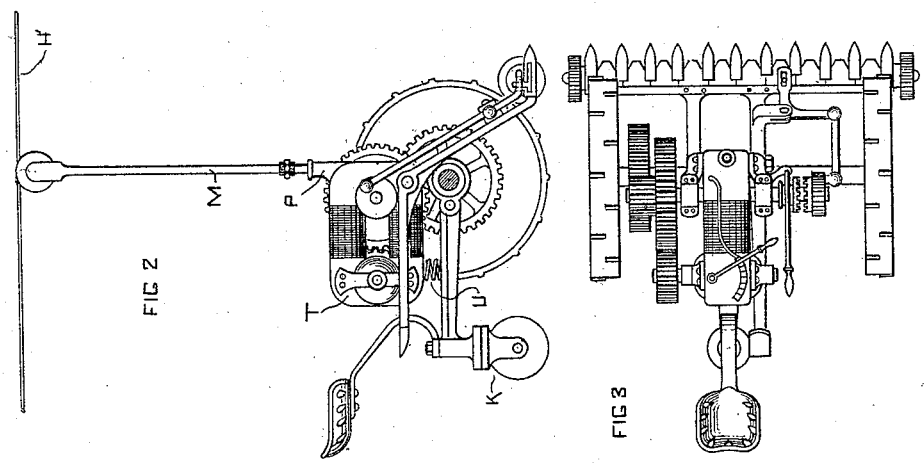

(No Model.) 3 Sheets—Sheet 3.
E. M. BENTLEY.
ELECTRIC AGRICULTURAL SYSTEM.
No. 444,265. Patented Jan. 6, 1891.
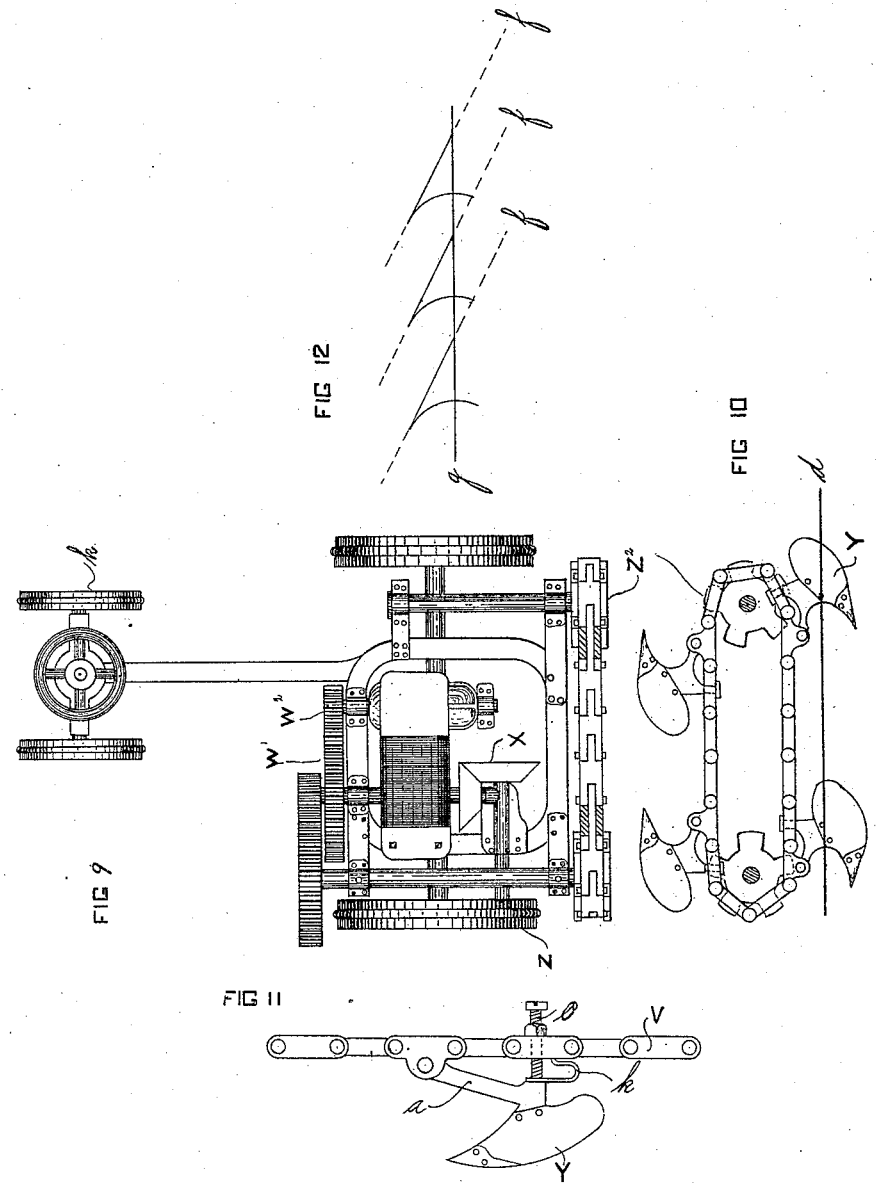
WITNESSES
Edwd S. M. Kinney
S. M. Cauldwell
INVENTOR
Edward M. Bentley
by Bentley & Knight
Attys

UNITED STATES PATENT OFFICE.

EDWARD M. BENTLEY, OF NEW YORK, N. Y.

ELECTRIC AGRICULTURAL SYSTEM.

SPECIFICATION forming part of Letters Patent No. 444,265, dated January 6, 1891.

Application filed May 11, 1888. Serial No. 273,621. (No model.)

*To all whom it may concern:*

Be it known that I, EDWARD M. BENTLEY, a citizen of the United States, residing at New York, in the county of New York, State of New York, have invented certain new and useful Improvements in Electric Agricultural Systems, of which the following is a specification.

My invention relates to an electric agricultural system of the same general type shown in my patent, No. 382,941, granted May 15, 1888. In this system two supply-wires are suspended upon opposite sides of a field and an electrically-actuated machine is driven forward and backward across the field, being provided with an electrical connection with the two opposite wires, respectively.

My present invention relates to a system of this general type; and it consists, first, in a general system by which a large number of fields can be operated together or successively.

It consists, second, in details of devices by which the electrical connection between the machine and the line-wire is maintained.

It consists, third, in a specific form of machine by which a plow or similar agricultural implement may be operated.

In the accompanying drawings, Figure 1 represents the general system. Fig. 2 is a side elevation of a mowing-machine electrically propelled. Fig. 3 is a plan of Fig. 2. Figs. 4, 5, 6, 7, and 8 represent details. Fig. 9 is a plan of my plowing-machine. Fig. 10 is a rear elevation of the plows. Fig. 11 is a detail of the same, and Fig. 12 is a diagram showing the action of the plow.

In Fig. 1, A and B are two main conductors extending along a farm or other large district. $C'$ $C^2$, hereinafter generally referred to as "wires C," &c., represent transverse connection-wires along the edges of definite fields or districts. It is intended that these wires C shall be readily removable from their supporting-posts by being provided at intervals with sockets adapted to fit a pin on the end of the post, as shown in Figs. 7 and 8. Where these wires C connect with the main wires A B, switches E $E^2$, &c., are provided, by which each wire C can be connected with either A or B, while by means of additional switches F $F^2$, &c., the wires C can be so connected that motors between any two successive pairs of them may be either in series or in multiple arc. Thus in the drawings the two motors represented by $D'$ and $D^2$ are in series, the current passing from the generator to switch $F^5$, wire $C^5$, motor $D^2$, wire $C^4$, switch $E^4$, switch $F^3$, wire $C^3$, motor $D'$, wire $C^2$, switch $E^2$ to wire A, thence to the generator. By a movement of the switches, which will be readily understood, the two motors may be placed in multiple arc.

The devices by which a motor as it progresses is maintained in connection with two of the wires C is illustrated in Figs. 2, 3, 4, and 5. Upon each of two opposite wires $C'$ and $C^2$ is a trolley G, and extending between two opposite trolleys are two wires $H'$ $H^2$. These two wires are respectively in electrical connection with the opposite trolleys G, while both of them have a mechanical connection with each trolley. One of these mechanical connections at each trolley, however, is insulated, as shown at K. These connections with the trolley are made through a bar J, which is pivoted to the trolley on a horizontal journal L directly opposite wire C.

Each machine is provided, as shown in Fig. 2, with an upright pole M, carrying at its upper end two contact-wheels N, insulated from each other and adapted to bear, respectively, on the under side of the wires $H'$ $H^2$. As will be seen in Fig. 6, one wheel N is connected to the metal of pole M, while the other is insulated therefrom. The two motor-terminals are connected, respectively, to the metal of the machine and to an insulated wire O, leading to insulated wheel N. As the machine progresses, therefore, there will be a constant circuit from one wire $C'$ through its trolley to wire $H'$, thence to contact N through the motor, and by the other contact N to the opposite wire $H^2$, and thence by the opposite trolley to the opposite wire $C'$. As shown in Figs. 2 and 6, the pole M is set in a socket E in the machine, so as to turn freely about a vertical axis, while the current from the insulated trolley is taken off by a ring R, free to move on an insulated band S, connected to the wire O, which passes down through pole M.

In Figs. 2 and 3 the rotary motion of the motor T is converted into a reciprocating motion, which is communicated to the knives of the machine by a well-known train of gearing. The motor itself is supported at one end upon the axle and at the other end on a spring U on steering-wheel K, so as to have a flexible bearing.

In Fig. 9 the armature of motor T is geared to the wheel by means of spur-gear $W'$ $W^2$, bevel gear-wheels X, leading to an inside gearing on wheel Z. The motor is also geared to a sprocket $Z^2$, which carries a chain V, carrying a series of plows Y. These plows are supported from the chain and by a spring $b$, being adjustable vertically by a screw $c$. As shown in Fig. 10, where $d$ represents the ground-line, these plows come around in succession, and as the machine is constantly advancing each one takes hold in the earth at a point somewhat in advance of the previous one. They are also set at an angle to the chain, so that, as in Fig. 12, the furrows will be at an angle to the line of forward movement of the machine.

In Fig. 12, $f\,f$, &c., represent the line of the furrows, while $g$ is the line of the axle.

It will be seen that the resistance offered by the earth to the plows is taken up by flanges on the wheels, which press into the ground and prevent side movement of the vehicle. The plows are also behind the vehicle, so that it will constantly have a hard uncut surface of ground on which to ride.

$k$ is a steering-wheel by which the vehicle may be directed.

What I claim, and desire to secure by Letters Patent, is—

1. The combination, with a main supply-conductor A, extending along one side of a district, of a connection-conductor C at an angle thereto, a third conductor having traveling connection with conductor C, and an electrically-actuated machine having a traveling connection with the said third conductor.

2. The combination, with a line-conductor extending along one side of a field or district to which it is desired to supply current in any part, of a transverse movable conductor extending across said field or district and having a traveling connection with said first-named conductor, and an electrically-actuated machine having a traveling electric connection with said transverse conductor.

3. The combination, with a line-conductor extending along one side of a field or district to which it is desired to supply current in any part, of a transverse movable conductor extending across said district and having a traveling connection with said first-named conductor, an electrically-actuated machine, and an upwardly-extending contact device from said machine traveling in electrical connection with said transverse conductor.

4. The combination, with a main supply-wire extending along one side of a district, of a transverse connection-wire at an angle thereto, provided with sockets to form a detachable support, and an electrically-actuated machine having a traveling connection with the said transverse conductor.

5. The combination, with two main supply-conductors extending along one side of a district, of a series of transverse connection-wires, switches along the said supply-wires at intervals for connecting the transverse wires thereto, and an electrically-actuated machine having a traveling connection with the said transverse wires.

6. The combination, with a main connection-conductor $C'$, of a transverse suspended conductor having a traveling connection therewith and an electrically-actuated machine having a traveling connection with the said suspended conductor.

7. The combination, with two conductors on opposite sides of a field or district, of two transverse suspended conductors having a traveling connection therewith and an electrically-actuated machine having a traveling connection with the said suspended conductors.

8. The combination, with conductors $C'\,C^2$, of two trolleys G upon said conductors, respectively, and of two conductors $H'\,H^2$, suspended from these trolleys, being insulated from each other, but connected, respectively, to the two trolleys and through them to $C'$ and $C^2$, respectively.

9. The combination, in an electric-power system, of one or more main conductors, as A B, in circuit with a source of electricity, with a corresponding connection wire or wires, as $C'\,C^2$, designed to travel over a field or district in electrical connection with the main conductor or conductors, and a traveling electrically-actuated machine movable along the line of the said wire or wires and kept in electrical connection therewith.

10. In an electrically-actuated system, the combination, with the main connection-conductors, of a transverse suspended conductor having a movable connection to the said connection-conductor, and an electrically-actuated machine having a traveling contact bearing against the said suspended conductor and movable about a vertical axis.

11. In an electrically-actuated machine, the combination, with a driving-axle, of an actuating-motor therefor, having one end supported upon said axle and the other end provided with a spring-support upon the third or steering wheel.

EDWARD M. BENTLEY.

Witnesses:
R. W. BLACKWELL,
JULIEN M. ELLIOT.